United States Patent
Fangman et al.

(10) Patent No.: US 11,409,058 B1
(45) Date of Patent: Aug. 9, 2022

(54) OPTICAL COMPONENT ALIGNMENT SYSTEM AND METHOD USING PLURAL FIDUCIALS

(71) Applicant: MACOM Technology Solutions Holdings, Inc., Lowell, MA (US)

(72) Inventors: Michael Everett Fangman, Reading, PA (US); Thomas Robert Daugherty, Allentown, PA (US); Hendrikus Johannes Jacobus Thoonen, Nijmegen (NL)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/176,977

(22) Filed: Feb. 16, 2021

(51) Int. Cl.
*G02B 6/42* (2006.01)
*G02B 6/122* (2006.01)

(52) U.S. Cl.
CPC ......... *G02B 6/4224* (2013.01); *G02B 6/1225* (2013.01); *G02B 6/4236* (2013.01)

(58) Field of Classification Search
CPC ... G02B 6/4224; G02B 6/1225; G02B 6/4236
See application file for complete search history.

(56) References Cited

U.S. PATENT DOCUMENTS

| | | | |
|---|---|---|---|
| 5,042,709 A | 8/1991 | Cina | |
| 6,933,536 B2 | 8/2005 | Bowen | |
| 7,234,874 B2 * | 6/2007 | Morse | G02B 6/30 385/39 |
| 10,466,433 B2 | 11/2019 | Epitaux | |

OTHER PUBLICATIONS

International Search Report and Written Opinion issued by the International Searching Authority, dated Apr. 13, 2022, for International Patent Application No. PCT/US2022/016258; 6 pages.

* cited by examiner

*Primary Examiner* — Andrew Jordan
(74) *Attorney, Agent, or Firm* — Faegre Drinker Biddle & Reath LLP

(57) ABSTRACT

Systems and methods are provided to align a first optical component carried by a first semiconductor chip with a second optical component carried by a second semiconductor chip. Each of the first semiconductor chip and the second semiconductor chip may include at least one primary semiconductor chip fiducial which assists in the alignment of the first optical component carried by a first semiconductor chip with a second optical component carried by a second semiconductor chip.

20 Claims, 10 Drawing Sheets

OPTICAL COMPONENT ALIGNMENT SYSTEM AND METHOD USING PLURAL FIDUCIALS

FIELD

The present disclosure relates to alignment systems and methods and in particular to alignment systems and methods for aligning optical components.

BACKGROUND

In some conventional optical systems, a semiconductor laser of a first semiconductor chip must be aligned with an optical component in a second semiconductor chip. Generally, the first semiconductor chip is stacked on top of the second semiconductor chip, or vice versa, and the semiconductor laser is coupled to the optical component of the second semiconductor chip through the faces of the first semiconductor chip and the second semiconductor chip facing each other. Since the first semiconductor chip and the second semiconductor chip are opaque to visible light, a visible alignment is not possible. Improvements in systems to permit alignment of optical components carried by respective semiconductor chips is needed.

SUMMARY

In an exemplary embodiment of the present disclosure, a method of aligning a first optical component and a second optical component is provided. The method comprising the steps of: detecting a first primary fiducial associated with the first optical component; detecting a second primary fiducial associated with the second optical component; determining a first secondary fiducial associated with the first optical component based on the detected first primary fiducial associated with the first optical component; determining a second secondary fiducial associated with the second optical component based on the detected second primary fiducial associated with the second optical component: determining the first secondary fiducial associated with the first optical component and the second secondary fiducial associated with the second optical component indicate the first optical component and the second optical component are misaligned; and moving at least one of the first optical component and the second optical component relative to the other of the first optical component and the second optical component to align the first optical component and the second optical component based on the first secondary fiducial associated with the first optical component and the second secondary fiducial associated with the second optical component.

In an example thereof, the first optical component is carried by a first semiconductor chip and the second optical component is carried by a second semiconductor chip. In a variation thereof, the first semiconductor chip includes a first face facing the second semiconductor chip and a second face opposite the first face and the second semiconductor chip includes a first face facing the first semiconductor chip and a second face opposite the first face, each of the first primary fiducial associated with the first optical component and the second primary fiducial associated with the second optical component being positioned between the second face of the first semiconductor chip and the second face of the second semiconductor chip. In a further variation thereof, the method further comprises the steps of: illuminating the first semiconductor chip and the second semiconductor chip with a light source at a first wavelength, the first wavelength being an infrared wavelength; and detecting light passing through the first semiconductor chip and the second semiconductor chip, wherein the steps of detecting the first primary fiducial associated with the first optical component and detecting the second primary fiducial associated with the second optical component are based on the light passing through the first semiconductor chip and the second semiconductor chip. In a still further variation thereof, the method further comprises the step of nesting the first primary fiducial associated with the first optical component in the second primary fiducial associated with the second optical component. In a further still variation thereof, the step of determining the first secondary fiducial associated with the first optical component based on the detected first primary fiducial associated with the first optical component includes the steps of: detecting feature information associated with the first primary fiducial associated with the first optical component; and determining the first secondary fiducial associated with the first optical component based on the detected feature information; and the step of determining the second secondary fiducial associated with the second optical component based on the detected second primary fiducial associated with the second optical component includes the steps of: detecting feature information associated with the second primary fiducial associated with the second optical component; and determining the second secondary fiducial associated with the second optical component based on the detected feature information. In yet a further still variation thereof, the detected feature information associated with the first primary fiducial associated with the first optical component includes a first plurality of points and the step of determining the first secondary fiducial associated with the first optical component based on the detected first primary fiducial associated with the first optical component includes the step of: fitting a circle to the first plurality of points to determine a first center of curvature, the first secondary fiducial associated with the first optical component being the first center of curvature; and the detected feature information associated with the second primary fiducial associated with the second optical component includes a second plurality of points and the step of determining the second secondary fiducial associated with the second optical component based on the detected second primary fiducial associated with the second optical component includes the step of: fitting a circle to the second plurality of points to determine a second center of curvature, the second secondary fiducial associated with the second optical component being the second center of curvature. In a further yet variation thereof, the first optical component and the second optical component are aligned when the first secondary fiducial and the second secondary fiducial are in a first arrangement. In another variation thereof, the first arrangement is vertically aligned. In still another variation thereof, the first arrangement is a known offset.

In another example thereof, the first optical component and the second optical component are aligned when the first secondary fiducial and the second secondary fiducial are in a first arrangement. In a variation thereof, the first arrangement is vertically aligned. In another variation thereof, the first arrangement is a known offset.

In a further example thereof, the method further comprises the step of nesting the first primary fiducial associated with the first optical component in the second primary fiducial associated with the second optical component.

In another exemplary embodiment of the present disclosure, an optical assembly is provided. The optical assembly comprising: a first optical component carried by a first semiconductor chip; a second optical component carried by a second semiconductor chip, the first semiconductor chip coupled to the second semiconductor chip and positioned relative to the second semiconductor chip to align the first optical component with the second optical component, the first semiconductor chip having a first face facing the second semiconductor chip and a second face opposite the first face and the second semiconductor chip having a first face facing the first semiconductor chip and a second face opposite the first face; a first primary semiconductor chip fiducial carried by the first semiconductor chip and positioned between the second face of the first semiconductor chip and the second face of the second semiconductor chip; a second primary semiconductor chip fiducial carried by the second semiconductor chip and positioned between the second face of the first semiconductor chip and the second face of the second semiconductor chip; wherein when the first optical component is aligned with the second optical component the first primary semiconductor chip fiducial has a first position relative to the second primary semiconductor chip fiducial and the first primary semiconductor chip is spaced apart from the second primary semiconductor chip fiducial in at least two orthogonal degrees of freedom.

In an example thereof, one of the first primary semiconductor chip fiducial and the second primary semiconductor chip fiducial nests within the other of the first primary semiconductor chip fiducial and the second primary semiconductor chip fiducial.

In another example thereof, the first optical component is formed at a first layer of the first semiconductor chip and the first primary semiconductor chip fiducial is formed at the first layer.

In a further example thereof, the second optical component is formed at a first layer of the second semiconductor chip and the second primary semiconductor chip fiducial is formed at the first layer.

In yet another example thereof, the first primary semiconductor chip fiducial includes a first curved portion having a first radius curvature and the second primary semiconductor chip fiducial includes a first curved portion having a second radius curvature, the second radius of curvature being different than the first radius of curvature. In a variation thereof, a first center of curvature of the first curved portion and a second center of curvature of the second curved portion are vertically aligned when the first optical component carried by the first semiconductor chip and the second optical component carried by the second semiconductor chip are aligned.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
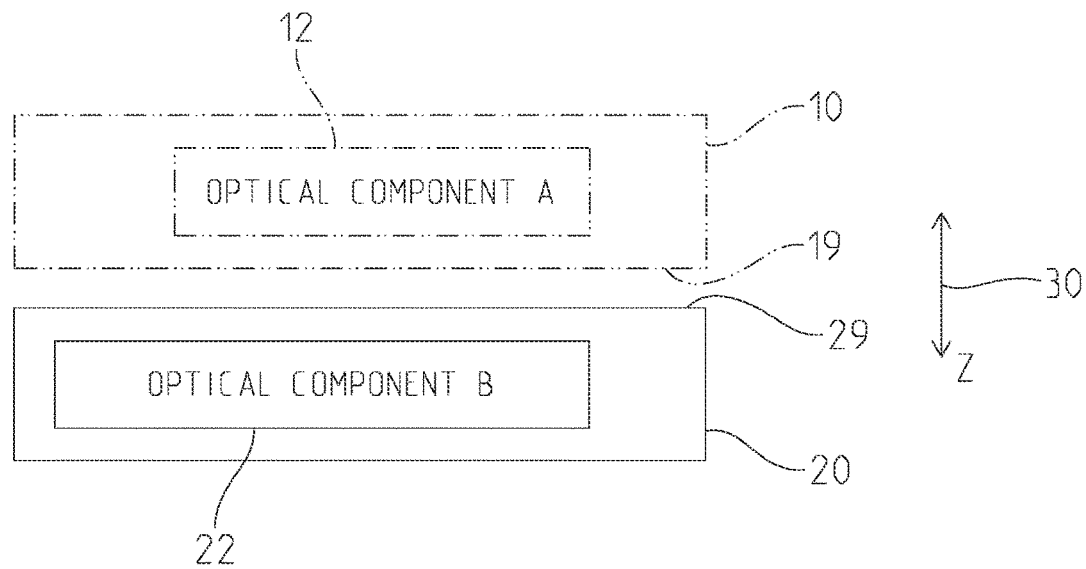
FIG. 1 illustrates a representative side view of a first optical component carried by a first semiconductor chip and a second optical component carried by a second semiconductor chip prior to alignment of the first semiconductor chip to the second semiconductor chip in a vertical direction.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, a first semiconductor chip 10 and a second semiconductor chip 20 are represented. First semiconductor chip 10 carries at least a first optical component 12. Second semiconductor chip 20 carries at least a second optical component 22. Exemplary optical components include semiconductor lasers, semiconductor waveguides, semiconductor modulators, semiconductor demodulators, semiconductor couplers, semiconductor decouplers, and other suitable devices for producing and/or transporting light, such as light at infrared wavelengths. Techniques to form various optical components on a semiconductor substrate to form a semiconductor chip carrying an optical component, such as through the deposition, etching, and other processes, are known in the art.

During manufacturing, it is desired to couple semiconductor chip 10 to semiconductor chip 20 and position semiconductor chip 10 relative to semiconductor chip 20 to optically align optical component 12 and optical component 22. The alignment of optical component 12 to optical component 22 must occur in a vertical, z-direction 30 (see FIG. 1), a first horizontal, x-direction 32 (see FIG. 2), and a second horizontal, y-direction 34 (see FIG. 2). As discussed herein, the alignment of semiconductor chip 10 to semiconductor chip 20 may be carried out by an alignment system 100 (see FIG. 10). As shown in FIG. 1, semiconductor chip 10 is spaced apart from semiconductor chip 20 in z-direction 30. Alignment system 100 can lower semiconductor chip 10 relative to semiconductor chip 20 or raise semiconductor chip 20 relative to semiconductor chip 10 to one of bring semiconductor chip 10 and semiconductor chip 20 into contact with each other or into contact with one or more bonding members, such as adhesives or solder, to secure semiconductor chip 10 to semiconductor chip 20.

Figure 2:
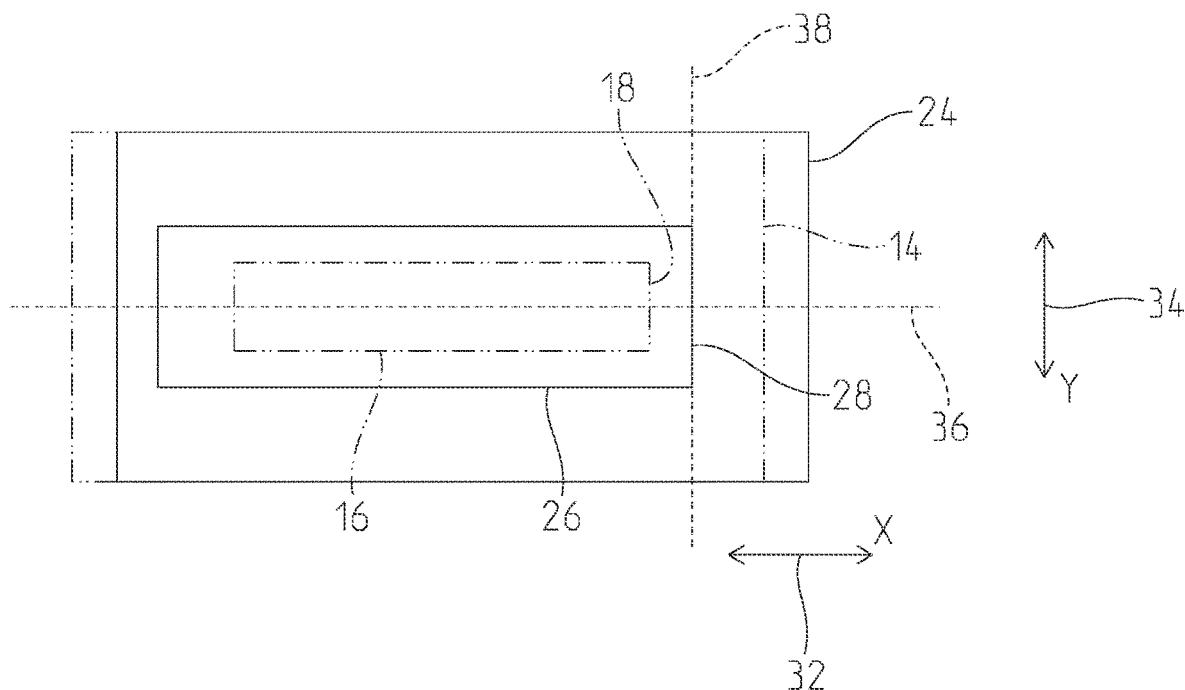
FIG. 2 illustrates a representative top view of the first optical component carried by the first semiconductor chip misaligned relative to the second optical component carried by the second semiconductor chip in a first horizontal direction and aligned in a second horizontal direction orthogonal to the first horizontal direction.

Referring to FIG. 2, a top view is shown of a horizontal envelope 14 of semiconductor chip 10, a horizontal envelope 16 of optical component 12, a horizontal envelope 24 of semiconductor chip 20, and a horizontal envelope 26 of optical component 22. In the example of FIG. 2, optical component 12 is aligned to optical component 22 when a first edge 18 of horizontal envelope 16 of optical component 12 and a first edge 28 of horizontal envelope 26 of optical component 22 are each aligned with a vertically extending plane 38 parallel to y-direction 34 and when each of horizontal envelope 16 of optical component 12 and horizontal envelope 26 of optical component 22 are centered about a vertically extending plane 36 parallel to x-direction 32. It should be understood that this alignment example is only an example and other alignment criteria may be used in the alignment of optical component 12 to optical component 22. As shown in FIG. 2, an arrangement is presented wherein optical component 12 is aligned to optical component 22 in y-direction 34, but is misaligned relative to optical component 22 in x-direction 32.

Figure 3:
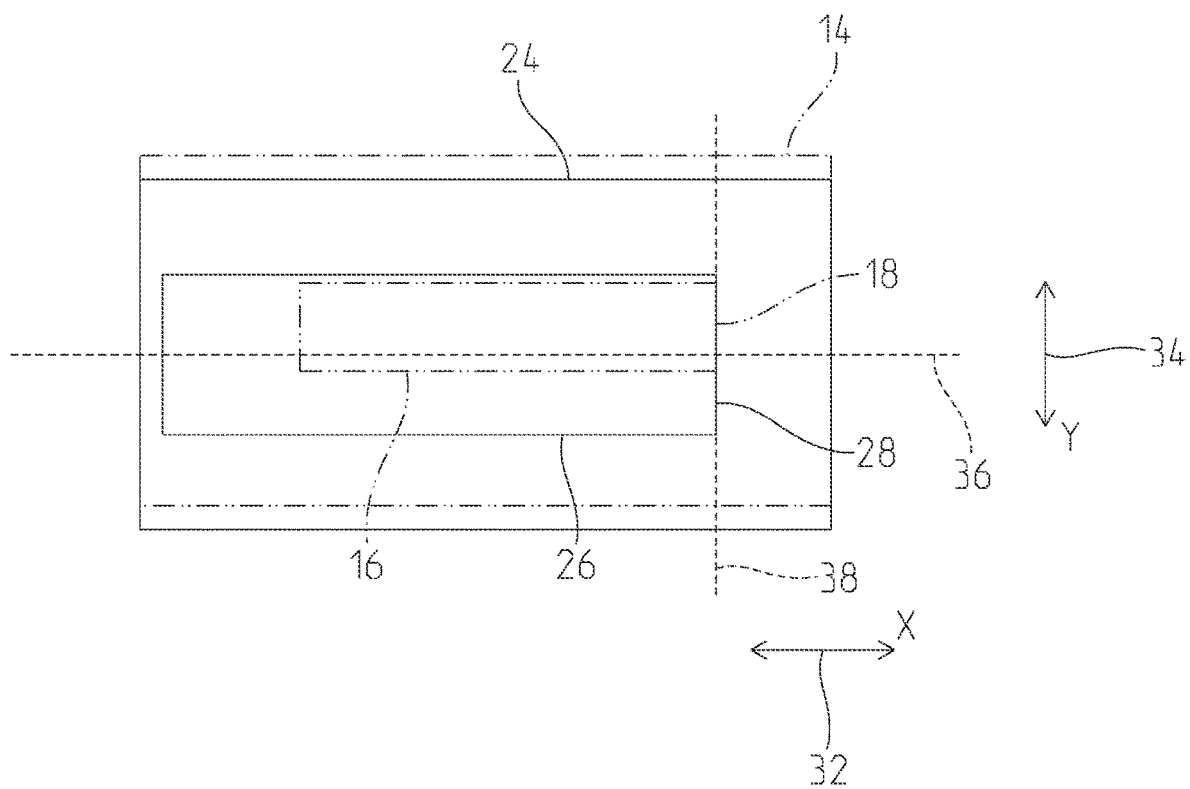
FIG. 3 illustrates a representative top view of the first optical component carried by the first semiconductor chip aligned relative to the second optical component carried by the second semiconductor chip in the first horizontal direction and misaligned in the second horizontal direction orthogonal to the first horizontal direction.
Figure 4:
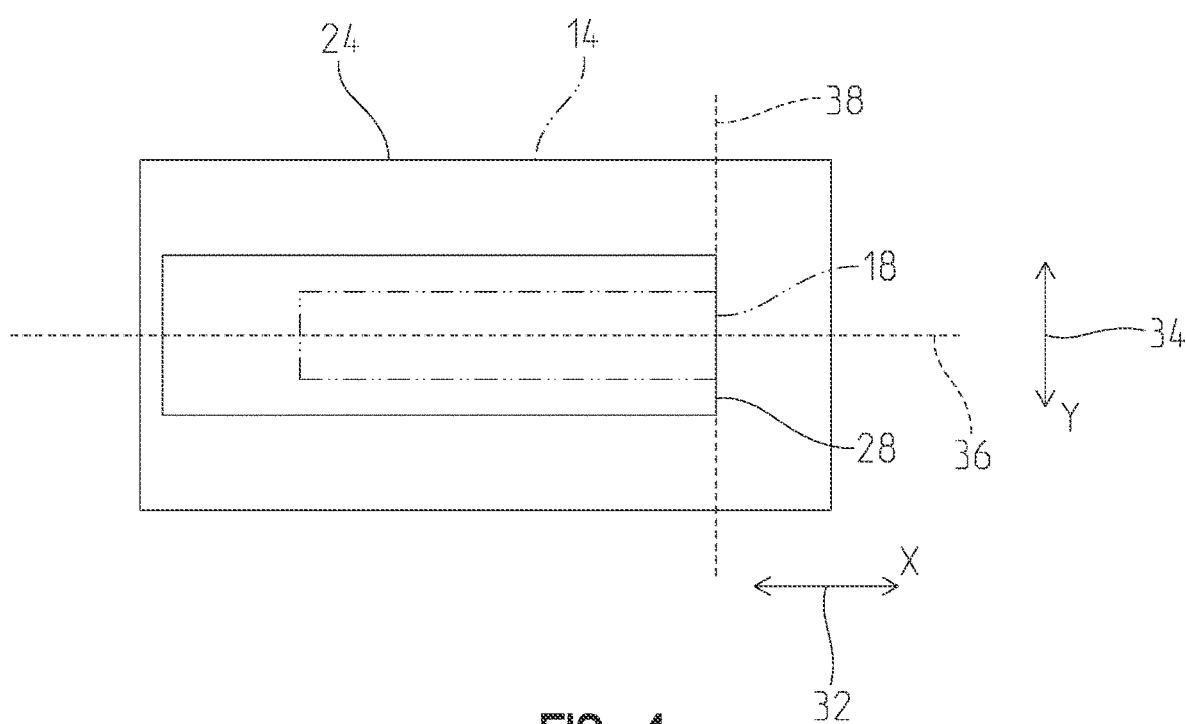
FIG. 4 illustrates a representative top view of the first optical component carried by the first semiconductor chip aligned relative to the second optical component carried by the second semiconductor chip in the first horizontal direction and aligned in the second horizontal direction orthogonal to the first horizontal direction.

Referring to FIG. 3, an arrangement is presented wherein optical component 12 is aligned to optical component 22 in x-direction 32, but is misaligned relative to optical component 22 in y-direction 34. Referring to FIG. 4, an arrangement is presented wherein optical component 12 is aligned to optical component 22 in both x-direction 32 and y-direction 34. Referring back to FIG. 1, the coupling of optical component 12 to optical component 22 occurs between a face 19 of semiconductor chip 10 facing semiconductor chip 20 and a face 29 of semiconductor chip 20 facing semiconductor chip 10. In embodiments, wherein semiconductor chip 10 is stacked on top of semiconductor chip 20, face 19 is a lower face of semiconductor chip 10 and face 29 of semiconductor chip 20 is an upper face of semiconductor chip 20. In embodiments, wherein semiconductor chip 20 is stacked on top of semiconductor chip 10, face 19 is an upper face of semiconductor chip 10 and face 29 of semiconductor chip 20 is a lower face of semiconductor chip 20. Due to the opaque nature of semiconductor chip 10 and semiconductor chip 20 to visible light, a visual alignment of optical component 12 to optical component 22 is not possible with a visible imaging system.

Figure 10:
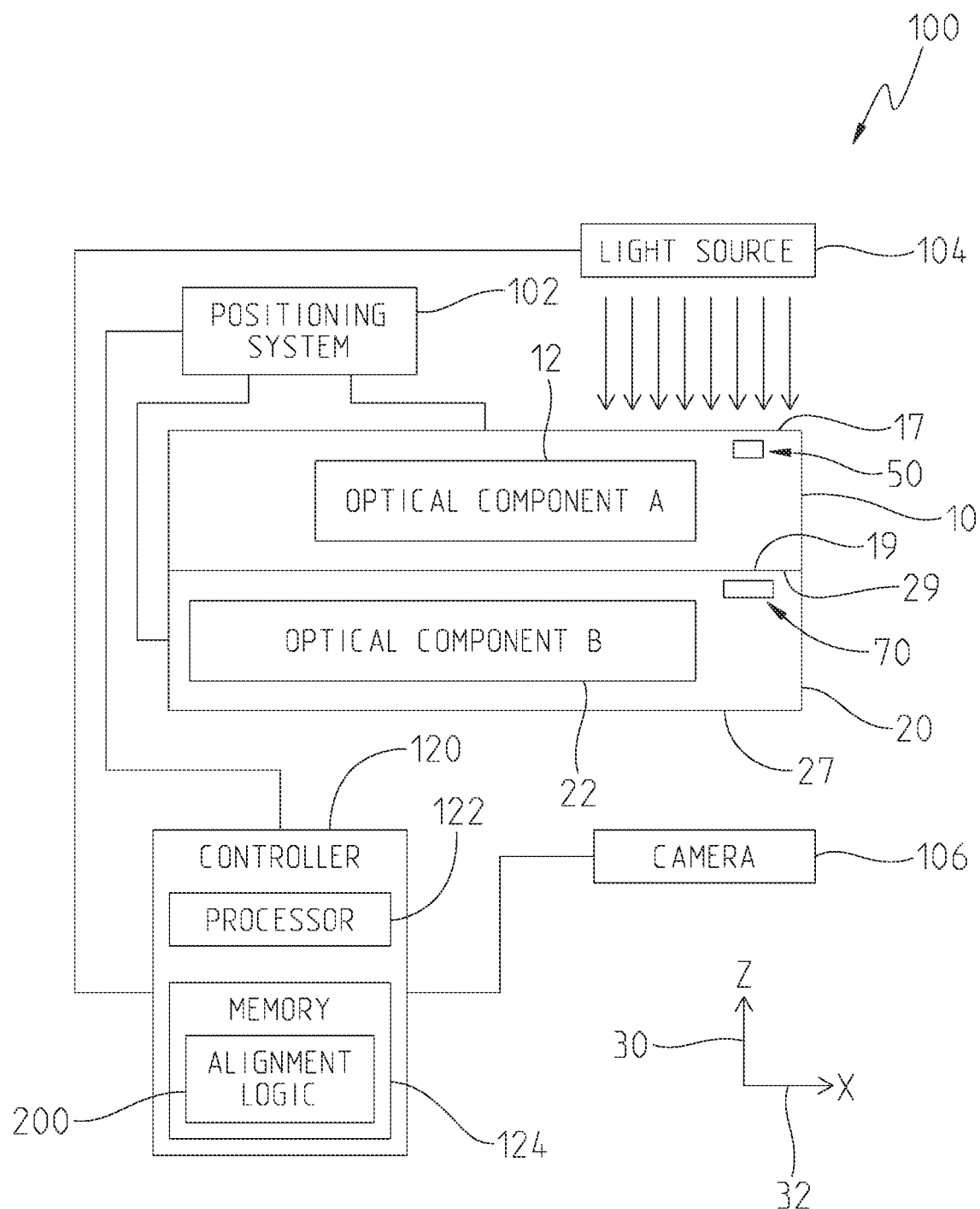
FIG. 10 illustrates a system diagram of an alignment system to align the first optical component carried by the first semiconductor chip relative to the second optical component carried by the second semiconductor chip in the first horizontal direction and in the second horizontal direction orthogonal to the first horizontal direction.

Referring to FIG. 10, alignment system 100 is shown. Alignment system 100 includes a positioning system 102 which is capable of moving at least one of semiconductor chip 10 and semiconductor chip 20 relative to the other semiconductor chip 10 and semiconductor chip 20 in each of z-direction 30, x-direction 32, and y-direction 34. positioning system 102 may include various conventional components such as linear actuators, rotary actuators, fixtures, sleds, motors, steppers motors, and other suitable components which hold each of semiconductor chip 10 and semiconductor chip 20 and provide the relative movement of semiconductor chip 10 and semiconductor chip 20 relative to each other.

Alignment system 100 further includes at least one light source 104 which illuminates portions of semiconductor chip 10 and semiconductor chip 20. As noted herein, semiconductor chip 10 and semiconductor chip 20 are opaque to visible light. In embodiments, light source 104 provides light in the infrared wavelength range. In embodiments, light source 104 may be controlled to provide light at multiple wavelengths. In examples, light source 104 may provide light of a first wavelength in a first setting and light of a second wavelength in a second setting, the second wavelength being different than the first wavelength. Interior features of semiconductor chip 10 and semiconductor chip 20 and surface features on the faces of semiconductor chip 10 and semiconductor chip 20 facing the other of semiconductor chip 10 and semiconductor chip 20 are visible at the first wavelength and the second wavelength to an infrared imaging system.

Alignment system 100 further includes as an imaging system at least one camera 106 which receives the light from light source 104 which passes through semiconductor chip 10 and semiconductor chip 20. Exemplary cameras include CCD array cameras and other suitable cameras. Each of positioning system 102, light source 104, and camera 106 are operatively coupled to an electronic controller 120.

Electronic controller 120, in the illustrated embodiment, is microprocessor-based, includes processor 122, and includes a non-transitory computer readable medium 124 which includes processing instructions stored therein that are executable by the microprocessor 122 of electronic controller 120 to control operation of positioning system 102, light source 104, and camera 106. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

For example, electronic controller 120 may execute an alignment logic 200 which based on input from camera 106 provides control signals to positioning system 102 and light source 104 to align optical component 12 of semiconductor chip 10 to optical component 22 of semiconductor chip 20. An exemplary processing sequence 250 of alignment logic 200 is discussed herein in connection with FIG. 11. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 120 is not microprocessor-based, but rather is configured to control operation of positioning system 102, light source 104, and camera 106 based on one or more sets of hardwired instructions and/or software instructions stored in a memory unit. Further, electronic controller 120 may be contained within a single device or be a plurality of devices networked together to provide the functionality described herein.

In embodiments, alignment system 100 determines a location of semiconductor chip 10 relative to semiconductor chip 20 based on at least one primary semiconductor chip fiducial 50 carried by semiconductor chip 10 and at least one primary semiconductor chip fiducial 70 carried by semiconductor chip 20. In embodiments, at least one primary semiconductor chip fiducial 50 of semiconductor chip 10 is positioned below an upper face 17 of semiconductor chip 10 which is exposed to light source 104. In one embodiment, at least one primary semiconductor chip fiducial 50 of semiconductor chip 10 is positioned at lower face 19 of semiconductor chip 10. In one embodiment, at least one primary semiconductor chip fiducial 50 of semiconductor chip 10 is positioned between upper face 17 and lower face 19 of semiconductor chip 10, such as in the illustrated embodiment of FIG. 10. In embodiments, at least one primary semiconductor chip fiducial 50 is provided in the same layer of semiconductor chip 10 as optical component 12. Similarly, in embodiments, at least one primary semiconductor chip fiducial 70 of semiconductor chip 20 is positioned below upper face 29 of semiconductor chip 10. In one embodiment, at least one primary semiconductor chip fiducial 70 of semiconductor chip 20 is positioned at upper face 29 of semiconductor chip 20. In one embodiment, at least one primary semiconductor chip fiducial 70 of semiconductor chip 20 is positioned between upper face 29 and lower face 27 of semiconductor chip 20, such as in the illustrated embodiment of FIG. 10. In embodiments, at least one primary semiconductor chip fiducial 70 is provided in the same layer of semiconductor chip 20 as optical component 22.

In embodiments, at least one primary semiconductor chip fiducial 50 of semiconductor chip 10 and at least one primary semiconductor chip fiducial 70 of semiconductor chip 20 nest or are otherwise overlapping at a given vertical height. In embodiments wherein at least one primary semiconductor chip fiducial 50 of semiconductor chip 10 and at least one primary semiconductor chip fiducial 70 of semiconductor chip 20 nest, there is sufficient gap between the features of at least one primary semiconductor chip fiducial 50 and at least one primary semiconductor chip fiducial 70 to permit movement of one of semiconductor chip 10 and semiconductor chip 20 relative to the other of semiconductor chip 10 and semiconductor chip 20 in x-direction 32 and y-direction 34 to permit alignment system 100 move one of semiconductor chip 10 and semiconductor chip 20 to align optical component 12 to optical component 22.

Figure 5:
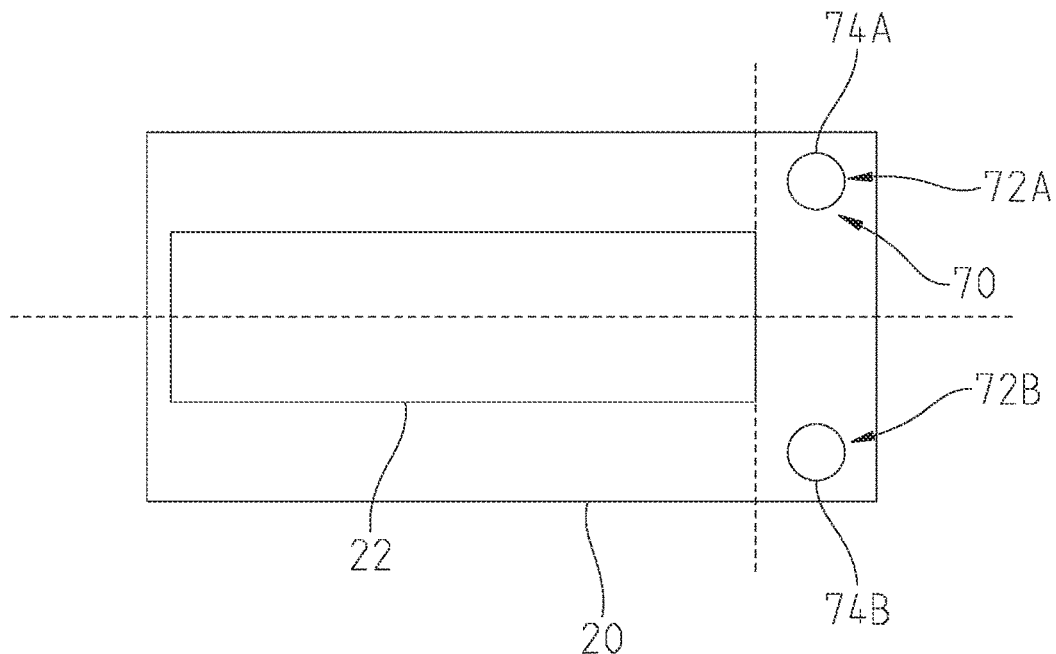
FIG. 5 illustrates a representative top view of the second optical component and second semiconductor chip, the second semiconductor chip further carrying a plurality of primary second semiconductor chip fiducials.
Figure 6:
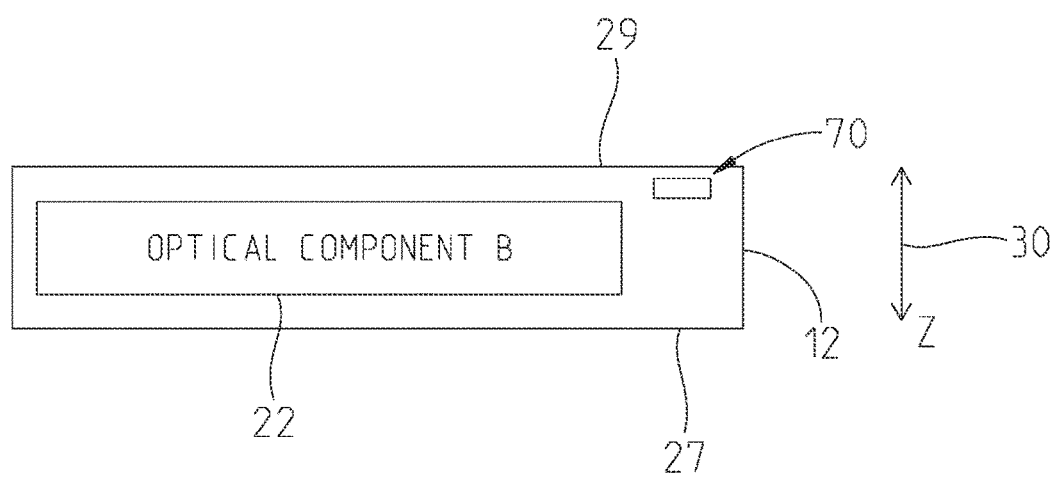
FIG. 6 illustrates a representative side view of the second optical component and second semiconductor chip, the second semiconductor chip further carrying the plurality of primary second semiconductor chip fiducials.

Referring to FIGS. 5 and 6, an exemplary embodiment of semiconductor chip 20 is illustrated. As shown in FIG. 5, at least one primary semiconductor chip fiducial 70 includes multiple fiducials, illustratively primary semiconductor chip fiducial 72A and primary semiconductor chip fiducial 72B. Each of primary semiconductor chip fiducial 72A and primary semiconductor chip fiducial 72B are shown as having an unbroken circular diameter 74A, 74B respectively. In other embodiments, the unbroken circular diameter 74A, 74B of each of 72A and 72B may be approximated by non-intersecting curves having the same center of curvature and either the same or differing diameters. Other exemplary primary fiducials may be used.

Further, as shown, primary semiconductor chip fiducials 70 are positioned between upper face 29 and lower face 27 of semiconductor chip 20. In embodiments, each of primary semiconductor chip fiducial 72A and primary semiconductor chip fiducial 72B are at the same height in z-direction 30. In embodiments, primary semiconductor chip fiducial 72A and primary semiconductor chip fiducial 72B are at differing heights in z-direction 30. In embodiments, primary semiconductor chip fiducial 72A and primary semiconductor chip fiducial 72B are vertically aligned with optical component 22 and formed in the same layer of semiconductor chip 20 as optical component 22. In embodiments, one or both of primary semiconductor chip fiducial 72A and primary semiconductor chip fiducial 72B forms part of upper face 29 of semiconductor chip 20 or lower face 27 of semiconductor chip 20.

Figure 7:
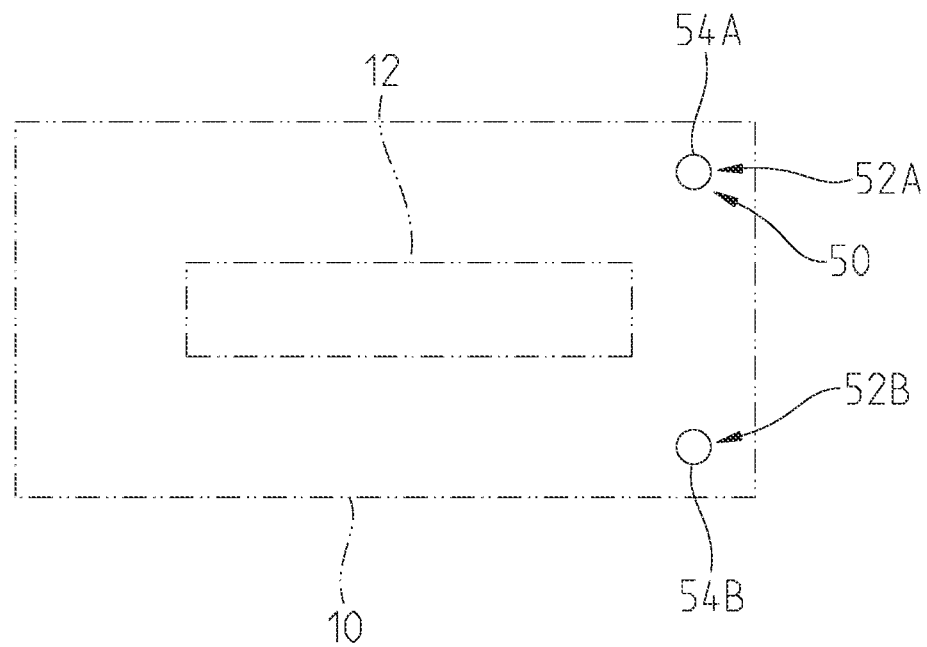
FIG. 7 illustrates a representative top view of the first optical component and first semiconductor chip, the first semiconductor chip further carrying a plurality of primary first semiconductor chip fiducials.
Figure 8:
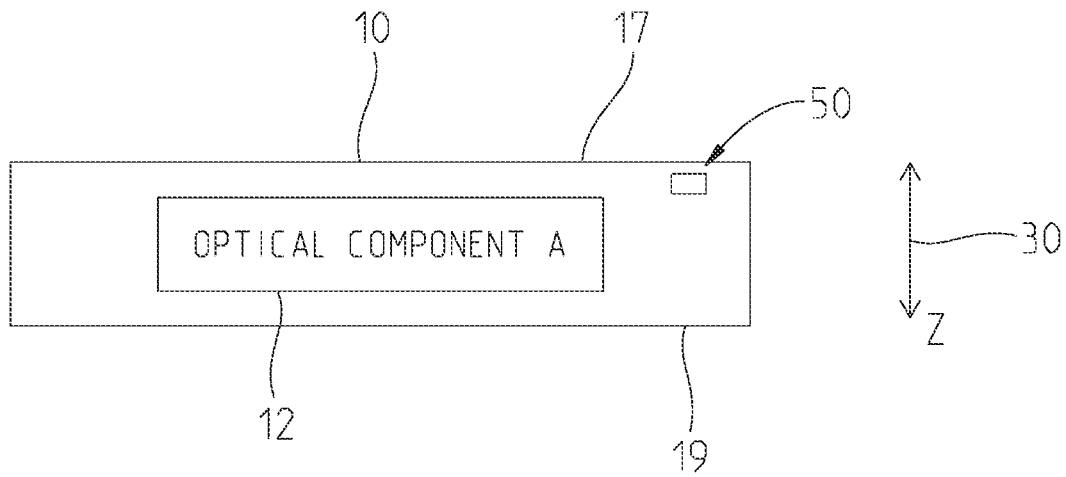
FIG. 8 illustrates a representative side view of the first optical component and first semiconductor chip, the first semiconductor chip further carrying the plurality of primary first semiconductor chip fiducials.

Referring to FIGS. 7 and 8, an exemplary embodiment of semiconductor chip 10 is illustrated. As shown in FIG. 7, at least one primary semiconductor chip fiducial 50 includes multiple fiducials, illustratively primary semiconductor chip fiducial 52A and primary semiconductor chip fiducial 52B. Each of primary semiconductor chip fiducial 52A and primary semiconductor chip fiducial 52B are shown as having an unbroken circular diameter 54A, 54B respectively. In other embodiments, the unbroken circular diameter 54A, 54B of each of 52A and 52B may be approximated by non-intersecting curves having the same center of curvature and either the same or differing diameters.

Further, as shown, primary semiconductor chip fiducials 50 are positioned between lower face 19 and upper face 17 of semiconductor chip 10. In embodiments, each of primary semiconductor chip fiducial 52A and primary semiconductor chip fiducial 52B are at the same height in z-direction 30. In embodiments, primary semiconductor chip fiducial 52A and primary semiconductor chip fiducial 52B are at differing heights in z-direction 30. In embodiments, primary semiconductor chip fiducial 52A and primary semiconductor chip fiducial 52B are vertically aligned with optical component 12 and formed in the same layer of semiconductor chip 10 as optical component 12. Other exemplary primary fiducials may be used. In embodiments, one or both of primary semiconductor chip fiducial 52A and primary semiconductor chip fiducial 52B forms part of lower face 19 of semiconductor chip 10 or upper face 17 of semiconductor chip 10.

Figure 9:
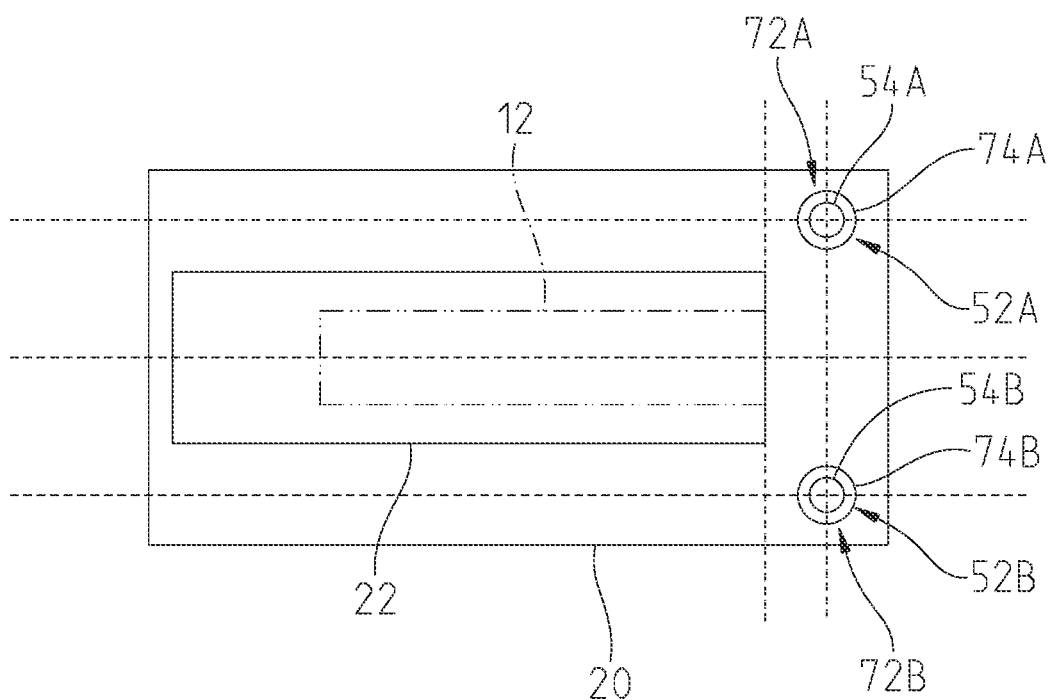
FIG. 9 illustrates a representative top view of the first optical component carried by the first semiconductor chip aligned relative to the second optical component carried by the second semiconductor chip in the first horizontal direction and aligned in the second horizontal direction orthogonal to the first horizontal direction, the plurality of primary first semiconductor chip fiducials of the first semiconductor chip are aligned with the plurality of primary second semiconductor chip fiducials of the second semiconductor chip.

With alignment system 100, circular diameter 74A of primary semiconductor chip fiducial 72A, circular diameter 74B of primary semiconductor chip fiducial 72B, circular diameter 54A of primary semiconductor chip fiducial 52A, and circular diameter 54B of primary semiconductor chip fiducial 52B, are visible by camera 106. Referring to FIG. 9, when optical component 12 is aligned to optical component 22, circular diameter 74A is concentric with circular diameter 54A and circular diameter 74B is concentric with circular diameter 54B. In other embodiments, other arrangements of circular diameter 74A and circular diameter 54A or circular diameter 74B and circular diameter 54B may indicate alignment of optical component 12 to optical component 22. Other exemplary arrangements, include an known offset between the centers or other features of primary semiconductor chip fiducial 52A and primary semiconductor chip fiducial 72A or primary semiconductor chip fiducial 52B and primary semiconductor chip fiducial 72B. With two fiducials for each of at least one primary semiconductor chip fiducial 50 of semiconductor chip 10 and at least one primary semiconductor chip fiducial 70 of semiconductor chip 20, optical component 12 may be aligned to optical component 22 in both x-direction 32 and y-direction 34 with alignment system 100. In embodiments including a single fiducial for each of at least one primary semiconductor chip fiducial 50 and at least one primary semiconductor chip fiducial 70, optical component 12 may be aligned to optical component 22 only angularly.

In embodiments, the accuracy of alignment optical component 12 to optical component 22 is limited due to the need to use longer wavelengths to transmit through the silicon substrates of semiconductor chip 10 and semiconductor chip 20. As explained herein, the accuracy of alignment system 100 may be improved by using feature information of primary semiconductor chip fiducial 50 to determine at least one secondary semiconductor chip fiducial of semiconductor chip 10 and by using feature information of primary semiconductor chip fiducial 70 to determine at least one secondary semiconductor chip fiducial of semiconductor chip 20. Further, alignment system 100 may use a first wavelength to identify each of at least one primary semiconductor chip fiducial 50 and at least one primary semiconductor chip fiducial 70 and a second wavelength to locate the feature information of at least one primary semiconductor chip fiducial 50 and at least one primary semiconductor chip fiducial 70, the second wavelength being shorter than the first wavelength. Exemplary feature information includes circular diameter 74A of primary semiconductor chip fiducial 72A, circular diameter 74B of primary semiconductor chip fiducial 72B, circular diameter 54A of primary semiconductor chip fiducial 52A, and circular diameter 54B of primary semiconductor chip fiducial 52B.

Figure 11:
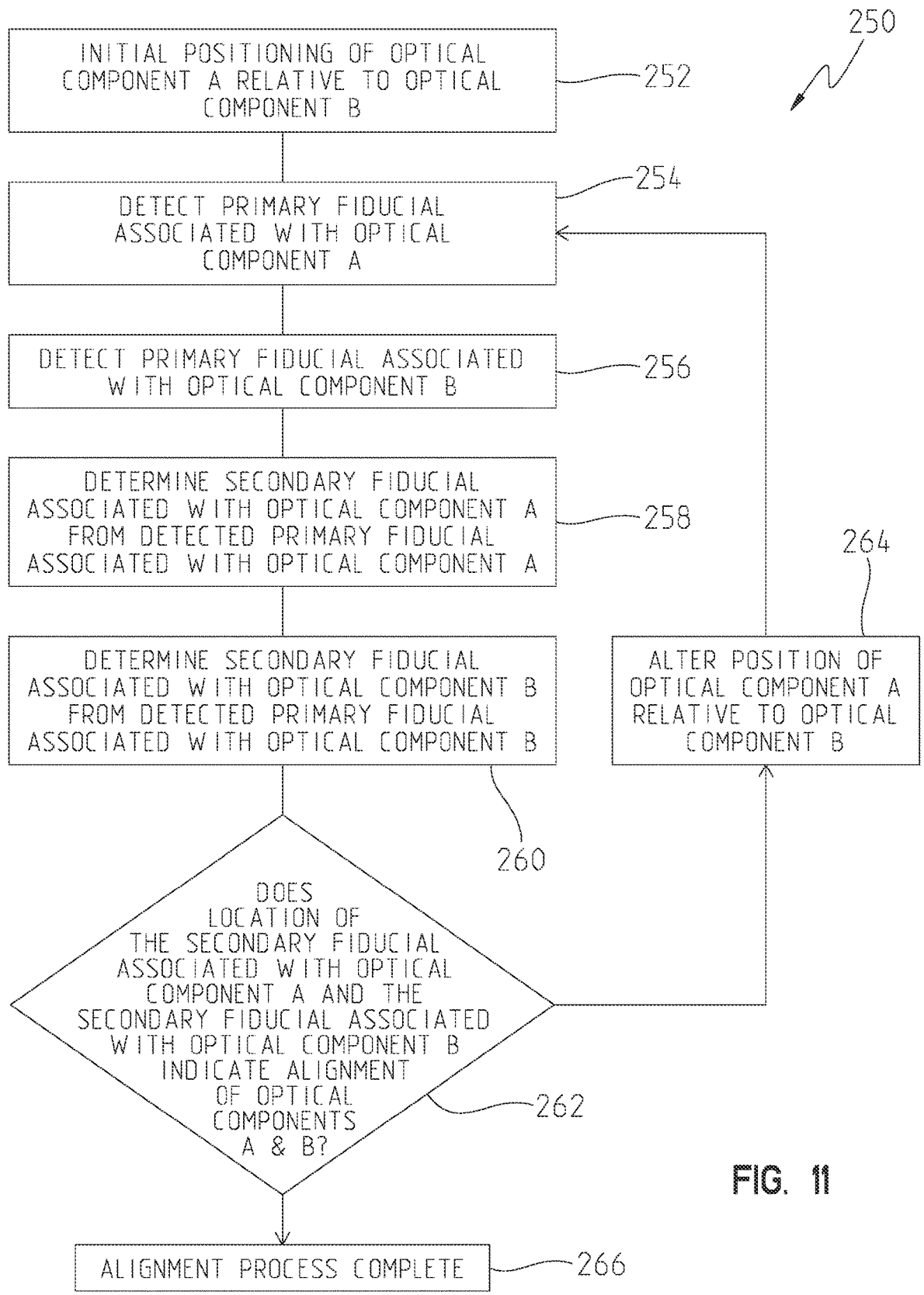
FIG. 11 illustrates an exemplary processing sequence carried out by the alignment system of FIG. 10 to align the first optical component carried by the first semiconductor chip relative to the second optical component carried by the second semiconductor chip in the first horizontal direction and in the second horizontal direction orthogonal to the first horizontal direction.

Referring to FIG. 11, an exemplary processing sequence 250 of alignment logic 200 is illustrated. Processing sequence 250 alters the position of semiconductor chip 10 relative to semiconductor chip 20 with positioning system 102 to align optical component 12 carried by semiconductor chip 10 relative to optical component 22 carried by semiconductor chip 20 in x-direction 32 and in y-direction 34. Processing sequence 250 initially positions optical component 12 of semiconductor chip 10 relative to optical component 22 of semiconductor chip 20, as represented by block 252.

The at least one primary semiconductor chip fiducial 50 of semiconductor chip 10 is detected, as represented by block 254, and the at least one primary semiconductor chip fiducial 70 of semiconductor chip 20 is detected, as represented by block 256. The detection of at least one primary semiconductor chip fiducial 50 and at least one primary semiconductor chip fiducial 70 is accomplished based on images received from camera 106. In the illustrative embodiments of FIGS. 5-8, each of circular diameter 74A of primary semiconductor chip fiducial 72A, circular diameter 74B of primary semiconductor chip fiducial 72B, circular diameter 54A of primary semiconductor chip fiducial 52A, and circular diameter 54B of primary semiconductor chip fiducial 52B is detected by analysis of images captured by camera 106.

Based on feature information of at least one primary semiconductor chip fiducial 50, alignment logic 200 determines at least one secondary semiconductor chip fiducial associated with optical component 12 of semiconductor chip 10, as represented by block 258, and at least one secondary semiconductor chip fiducial associated with optical component 22 of semiconductor chip 20, as represented by block 260.

Figure 12:
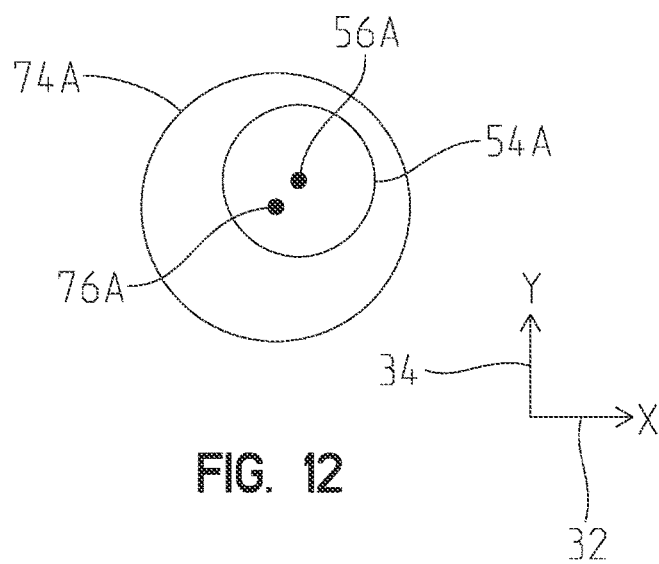
FIG. 12 illustrates a first primary first semiconductor chip fiducial of the first semiconductor chip, a first determined secondary first semiconductor chip fiducial of the first semiconductor chip; a first primary second semiconductor chip fiducial of the second semiconductor chip, and a first determined secondary second semiconductor chip fiducial of the second semiconductor chip, wherein the first optical component carried by the first semiconductor chip is misaligned relative to the second optical component carried by the second semiconductor chip in both the first horizontal direction and in the second horizontal direction orthogonal to the first horizontal direction.

Referring to FIG. 12, an unbroken circular diameter 54A of primary semiconductor chip fiducial 52A and unbroken circular diameter 74A of primary semiconductor chip fiducial 72A are illustrated. Further, a secondary semiconductor chip fiducial 56A determined by alignment logic 200 based on unbroken circular diameter 54A of primary semiconductor chip fiducial 52A and a secondary semiconductor chip fiducial 76A determined by alignment logic 200 based on unbroken circular diameter 74A of primary semiconductor chip fiducial 72A are shown. In embodiments, for each of unbroken circular diameter 54A and unbroken circular diameter 74A, alignment logic 200 locates a number of points lying on the respective unbroken circular diameter 54A and unbroken circular diameter 74A and then fits those points to a circle by minimizing the average offset of each point from the fit circle. Upon determining the best fit circle, alignment logic 200 is able to locate a center of the circle fit to the points of unbroken circular diameter 54A, the center being determined secondary semiconductor chip fiducial 56A, and is able to locate a center of the circle fit to the points of unbroken circular diameter 74A, the center being determined secondary semiconductor chip fiducial 76A. By having a symmetrical feature for primary semiconductor chip fiducial 52A and primary semiconductor chip fiducial 72A, illustratively a circular feature, the accuracy of alignment system 100 may be improved because the positioning of points around determined secondary semiconductor chip fiducial 56A and determined secondary semiconductor chip fiducial 76A negates the resolving limit of the vision system, camera 106, of alignment system 100. By having different diameters for unbroken circular diameter 54A and unbroken circular diameter 74A, alignment system 100 is always able to independently determine the position of determined secondary semiconductor chip fiducial 56A and determined secondary semiconductor chip fiducial 76A.

Figure 13:
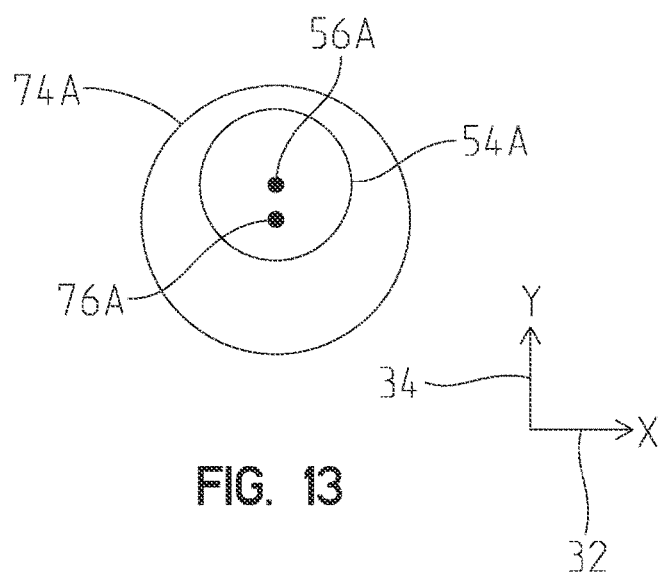
FIG. 13 illustrates the first primary first semiconductor chip fiducial of the first semiconductor chip, the first determined secondary first semiconductor chip fiducial of the first semiconductor chip; the first primary second semiconductor chip fiducial of the second semiconductor chip, and the first determined secondary second semiconductor chip fiducial of the second semiconductor chip, wherein the first optical component carried by the first semiconductor chip is aligned relative to the second optical component carried by the second semiconductor chip in the first horizontal direction and misaligned in the second horizontal direction orthogonal to the first horizontal direction.
Figure 14:
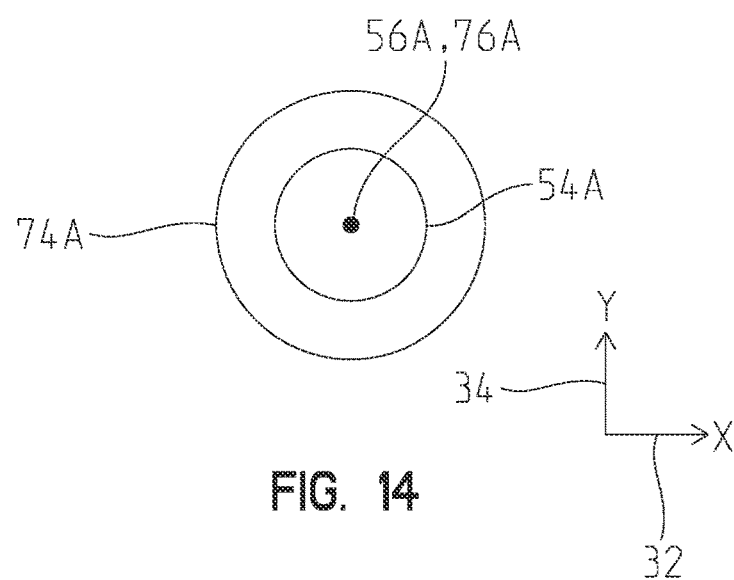
FIG. 14 illustrates the first primary first semiconductor chip fiducial of the first semiconductor chip, the first determined secondary first semiconductor chip fiducial of the first semiconductor chip; the first primary second semiconductor chip fiducial of the second semiconductor chip, and the first determined secondary second semiconductor chip fiducial of the second semiconductor chip, wherein the first optical component carried by the first semiconductor chip is aligned relative to the second optical component carried by the second semiconductor chip in both the first horizontal direction and in the second horizontal direction orthogonal to the first horizontal direction.

Returning to FIG. 11, alignment logic 200 reviews the locations of determined secondary semiconductor chip fiducial 56A and determined secondary semiconductor chip fiducial 76A to determine if their relative locations indicate that first optical component 12 of first semiconductor chip 10 is aligned with second optical component 22 of second semiconductor chip 20, as represented by block 262. In embodiments, first optical component 12 of first semiconductor chip 10 is aligned with second optical component 22 of second semiconductor chip 20 when determined secondary semiconductor chip fiducial 56A is at the same position as, vertically aligned with, determined secondary semiconductor chip fiducial 76A. As shown in FIG. 12, determined secondary semiconductor chip fiducial 56A is offset from determined secondary semiconductor chip fiducial 76A in both x-direction 32 and y-direction 34. Based on the offset of determined secondary semiconductor chip fiducial 56A from determined secondary semiconductor chip fiducial 76A in both x-direction 32 and y-direction 34, alignment logic 200 controls positioning system 102 to move determined secondary semiconductor chip fiducial 56A to the same location as determined secondary semiconductor chip fiducial 76A, as represented by block 264. For example and referring to FIG. 13, alignment logic 200 through positioning system 102 moves one of first semiconductor chip 10 and second semiconductor chip 20 to eliminate the offset between determined secondary semiconductor chip fiducial 56A and determined secondary semiconductor chip fiducial 76A in x-direction 32, but the offset in y-direction 34 remains. Alignment logic 200 next through positioning system 102 moves one of first semiconductor chip 10 and second semiconductor chip 20 to eliminate the offset between determined secondary semiconductor chip fiducial 56A and determined secondary semiconductor chip fiducial 76A in y-direction 34, as shown is FIG. 14. In FIG. 14, determined secondary semiconductor chip fiducial 56A and determined secondary semiconductor chip fiducial 76A are at the same location which indicates that first optical component 12 of first semiconductor chip 10 is aligned with second optical component 22 of second semiconductor chip 20 and the alignment process is complete, as represented by block 266 in FIG. 11. In other embodiments, first optical component 12 of first semiconductor chip 10 is aligned with second optical component 22 of second semiconductor chip 20 when a known offset in one or both of x-direction 32 and y-direction 34 is present. If this is the case, alignment logic 200 will move with positioning system 102 one of first semiconductor chip 10 and second semiconductor chip 20 provide the known offset as part of processing sequence 250.

In embodiments, alignment logic 200 monitors changes in the position of determined secondary semiconductor chip fiducial 56A and determined secondary semiconductor chip fiducial 76A compared to commanded movements of positioning system 102 to monitor the accuracy of the movements of positioning system 102 and to provide an indication to an operator of an issue with the accuracy or operation of alignment system 100. In embodiments, the positions of each determined secondary semiconductor chip fiducial 56A and determined secondary semiconductor chip fiducial 76A may be determined at multiple wavelengths to determine the accuracy of the alignment at each wavelength.

Figure 15:
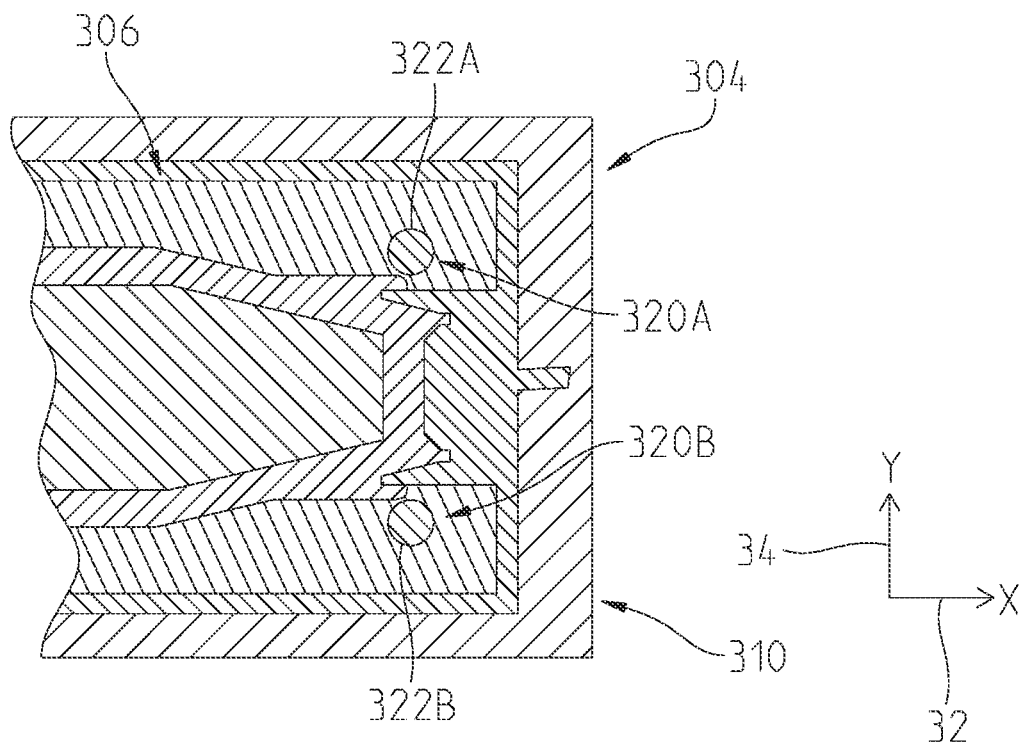
FIG. 15 illustrates a top view of a portion of an exemplary second semiconductor chip including an optical waveguide and a plurality of primary fiducials in the same layer of the second semiconductor chip as the optical waveguide.
Figure 16:
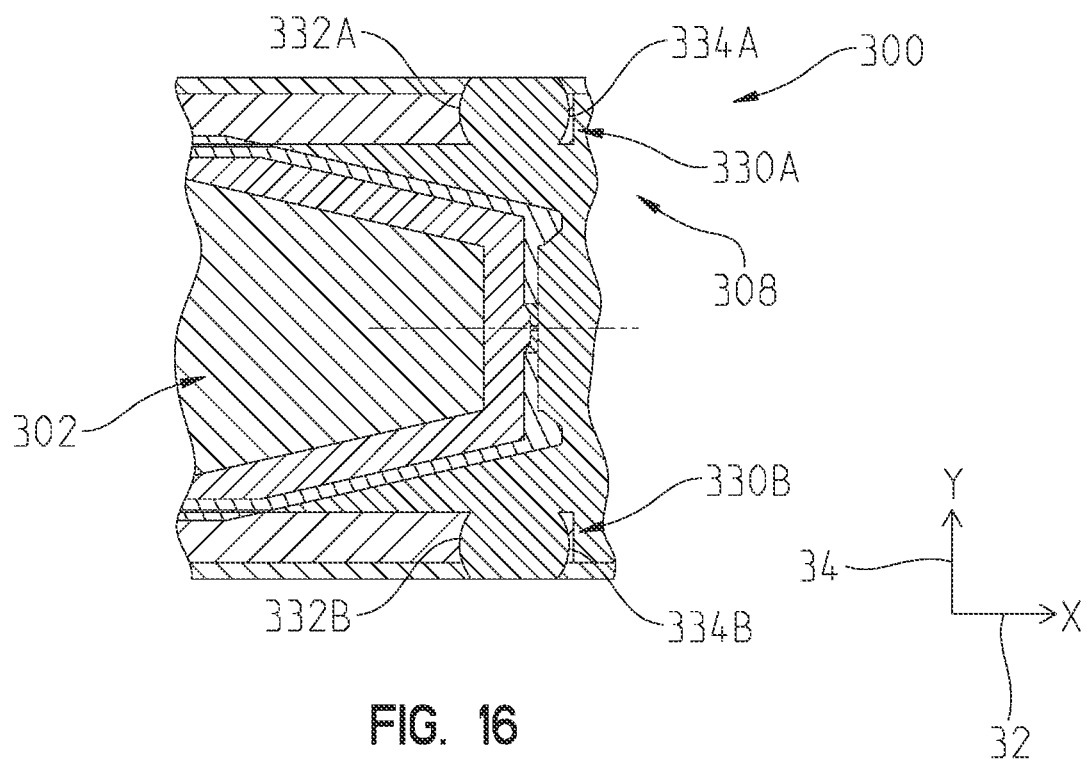
FIG. 16 illustrates a bottom view of a portion of an exemplary first semiconductor chip including a semiconductor laser and a plurality of primary fiducials in the facet etch layer of the first semiconductor chip as the optical waveguide.
Figure 17:
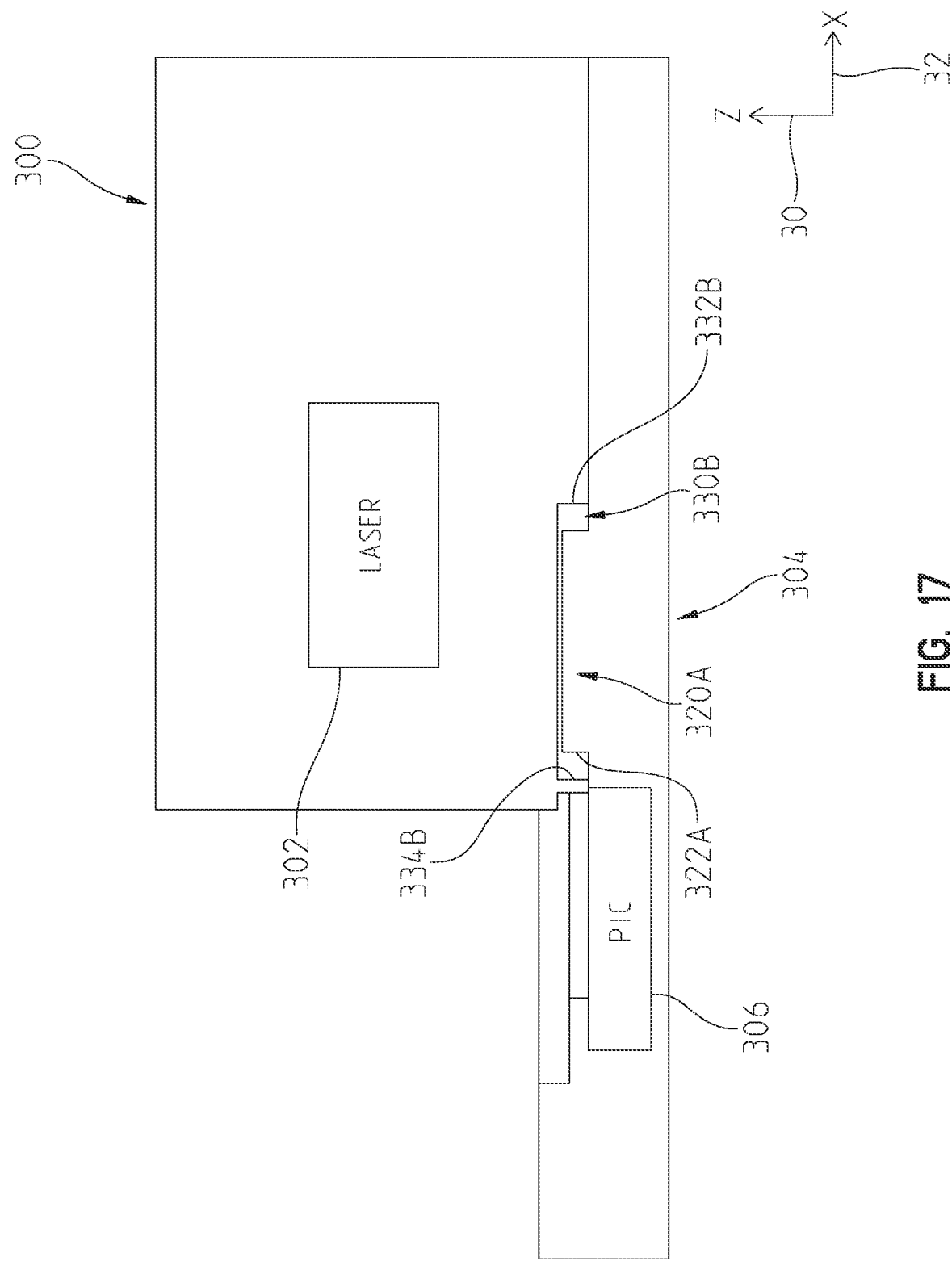
FIG. 17 illustrates a side view of portions of the exemplary first semiconductor chip of FIG. 16 and the exemplary second semiconductor chip of FIG. 15.

Referring to FIGS. 15-17, an example is provided. Referring to FIG. 17, a first semiconductor chip 300 includes a semiconductor laser 302 and a second semiconductor chip 304 includes a photonic integrated circuit (PIC) 306. As shown in FIG. 17, first semiconductor chip 300 is positioned on top of second semiconductor chip 304 and is to be positioned to align semiconductor laser 302 with photonic integrated circuit 306.

First semiconductor chip 300 includes a primary semiconductor chip fiducial 308 and second semiconductor chip 304 includes a primary semiconductor fiducial 310. As shown in FIG. 17, primary semiconductor chip fiducial 308 is a recess and primary semiconductor fiducial 310 is a protrusion. Primary semiconductor fiducial 310 nests inside of primary semiconductor chip fiducial 308. The relative sizes of primary semiconductor chip fiducial 308 and primary semiconductor fiducial 310 are selected to provide movement of first semiconductor chip 300 relative to second semiconductor chip 304 in x-direction 32 and y-direction 34.

Referring to FIG. 15, a top view of second semiconductor chip 304 is shown. Primary semiconductor fiducial 310 includes multiple fiducials, illustratively primary semiconductor chip fiducial 320A and primary semiconductor chip fiducial 320B. Each of primary semiconductor chip fiducial 320A and primary semiconductor chip fiducial 320B are shown as having an unbroken circular diameter 322A, 322B respectively. In other embodiments, the unbroken circular diameter 322A, 322B of each of 322A and 322B may be approximated by non-intersecting curves having the same center of curvature and either the same or differing diameters. Primary semiconductor chip fiducial 320A and primary semiconductor chip fiducial 320B are formed in a waveguide layer of second semiconductor chip 304 which is the same layer as a waveguide of photonic integrated circuit 306. Primary semiconductor chip fiducial 320A and primary semiconductor chip fiducial 320B are protrusions that are nested with corresponding recesses on first semiconductor chip 300.

Referring to FIG. 16, a bottom view of first semiconductor chip 300 is shown. Primary semiconductor chip fiducial 308 includes multiple fiducials, illustratively primary semiconductor chip fiducial 330A and primary semiconductor chip fiducial 330B. Each of primary semiconductor chip fiducial 330A and primary semiconductor chip fiducial 330B are shown as having non-intersecting curves 332A and 334A for primary semiconductor chip fiducial 330A and non-intersecting curves 332B and 334B for primary semiconductor chip fiducial 330B. In the illustrated embodiment, non-intersecting curves 332A and 334A have the same center of curvature and the same diameter and non-intersecting curves 332B and 334B have the same center of curvature and the same diameter. Primary semiconductor chip fiducial 330A and primary semiconductor chip fiducial 330B are formed in an etch layer of first semiconductor chip 300. Primary semiconductor chip fiducial 330A and primary semiconductor chip fiducial 330B are recesses which receive the protrusions of unbroken circular diameter 322A and unbroken circular diameter 322B.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method of aligning a first optical component and a second optical component, the method comprising the steps of:
    detecting a first primary fiducial associated with the first optical component;
    detecting a second primary fiducial associated with the second optical component;
    determining a first secondary fiducial associated with the first optical component based on the detected first primary fiducial associated with the first optical component;
    determining a second secondary fiducial associated with the second optical component based on the detected second primary fiducial associated with the second optical component;
    determining the first secondary fiducial associated with the first optical component and the second secondary fiducial associated with the second optical component indicate the first optical component and the second optical component are misaligned; and
    moving at least one of the first optical component relative to the other of the second optical component to align the first optical component and the second optical component based on the first secondary fiducial associated with the first optical component and the second secondary fiducial associated with the second optical component.

2. The method of claim 1, wherein the first optical component is carried by a first semiconductor chip and the second optical component is carried by a second semiconductor chip.

3. The method of claim 2, wherein the first semiconductor chip includes a first face facing the second semiconductor chip and a second face opposite the first face and the second semiconductor chip includes a first face facing the first semiconductor chip and a second face opposite the first face, each of the first primary fiducial associated with the first optical component and the second primary fiducial associated with the second optical component being positioned between the second face of the first semiconductor chip and the second face of the second semiconductor chip.

4. The method of claim 3, further comprising the steps of:
    illuminating the first semiconductor chip and the second semiconductor chip with a light source at a first wavelength, the first wavelength being an infrared wavelength; and
    detecting light passing through the first semiconductor chip and the second semiconductor chip, wherein the steps of detecting the first primary fiducial associated with the first optical component and detecting the second primary fiducial associated with the second optical component are based on the light passing through the first semiconductor chip and the second semiconductor chip.

5. The method of claim 4, further comprising the step of nesting the first primary fiducial associated with the first optical component in the second primary fiducial associated with the second optical component.

6. The method of claim 4, wherein
    the step of determining the first secondary fiducial associated with the first optical component based on the detected first primary fiducial associated with the first optical component includes the steps of:
        detecting feature information associated with the first primary fiducial associated with the first optical component; and
        determining the first secondary fiducial associated with the first optical component based on the detected feature information; and
    the step of determining the second secondary fiducial associated with the second optical component based on the detected second primary fiducial associated with the second optical component includes the steps of:
        detecting feature information associated with the second primary fiducial associated with the second optical component; and
        determining the second secondary fiducial associated with the second optical component based on the detected feature information.

7. The method of claim 6, wherein
    the detected feature information associated with the first primary fiducial associated with the first optical component includes a first plurality of points and the step of determining the first secondary fiducial associated with the first optical component based on the detected first primary fiducial associated with the first optical component includes the step of:
        fitting a circle to the first plurality of points to determine a first center of curvature, the first secondary fiducial associated with the first optical component being the first center of curvature; and the detected feature information associated with the second primary fiducial associated with the second optical component includes a second plurality of points and the step of determining the second secondary fiducial associated with the second optical component based on the detected second primary fiducial associated with the second optical component includes the step of:
fitting a circle to the second plurality of points to determine a second center of curvature, the second secondary fiducial associated with the second optical component being the second center of curvature.

8. The method of claim 7, wherein the first optical component and the second optical component are aligned when the first secondary fiducial and the second secondary fiducial are in a first arrangement.

9. The method of claim 8, wherein the first arrangement is vertically aligned.

10. The method of claim 8, wherein the first arrangement is a known offset.

11. The method of claim 1, wherein the first optical component and the second optical component are aligned when the first secondary fiducial and the second secondary fiducial are in a first arrangement.

12. The method of claim 11, wherein the first arrangement is vertically aligned.

13. The method of claim 11, wherein the first arrangement is a known offset.

14. The method of claim 1, further comprising the step of nesting the first primary fiducial associated with the first optical component in the second primary fiducial associated with the second optical component.

15. An optical assembly comprising:
a first optical component carried by a first semiconductor chip;
a second optical component carried by a second semiconductor chip, the first semiconductor chip coupled to the second semiconductor chip and positioned relative to the second semiconductor chip to align the first optical component with the second optical component, the first semiconductor chip having a first face facing the second semiconductor chip and a second face opposite the first face and the second semiconductor chip having a first face facing the first semiconductor chip and a second face opposite the first face;
a first primary semiconductor chip fiducial carried by the first semiconductor chip and positioned between the second face of the first semiconductor chip and the second face of the second semiconductor chip;
a second primary semiconductor chip fiducial carried by the second semiconductor chip and positioned between the second face of the first semiconductor chip and the second face of the second semiconductor chip;
wherein when the first optical component is aligned with the second optical component the first primary semiconductor chip fiducial has a first position relative to the second primary semiconductor chip fiducial and the first primary semiconductor chip is spaced apart from the second primary semiconductor chip fiducial in at least two orthogonal degrees of freedom.

16. The optical assembly of claim 15, wherein one of the first primary semiconductor chip fiducial and the second primary semiconductor chip fiducial nests within the other of the first primary semiconductor chip fiducial and the second primary semiconductor chip fiducial.

17. The optical assembly of claim 15, wherein the first optical component is formed at a first layer of the first semiconductor chip and the first primary semiconductor chip fiducial is formed at the first layer.

18. The optical assembly of claim 15, wherein the second optical component is formed at a first layer of the second semiconductor chip and the second primary semiconductor chip fiducial is formed at the first layer.

19. The optical system of claim 15, wherein the first primary semiconductor chip fiducial includes a first curved portion having a first radius curvature and the second primary semiconductor chip fiducial includes a first curved portion having a second radius curvature, the second radius of curvature being different than the first radius of curvature.

20. The optical system of claim 19, wherein a first center of curvature of the first curved portion and a second center of curvature of the second curved portion are vertically aligned when the first optical component carried by the first semiconductor chip and the second optical component carried by the second semiconductor chip are aligned.

* * * * *